United States Patent [19]

Maddox et al.

[11] Patent Number: 4,478,238
[45] Date of Patent: Oct. 23, 1984

[54] CONDENSATE REMOVAL DEVICE

[75] Inventors: James W. Maddox, Newport News; David D. Berger, Alexandria, both of Va.

[73] Assignee: The United States of America as represented by the United States Department of Energy, Washington, D.C.

[21] Appl. No.: 305,766

[22] Filed: Sep. 25, 1981

[51] Int. Cl.³ ............................................. F16T 1/34
[52] U.S. Cl. ..................................... 137/171; 138/41; 138/44; 137/549
[58] Field of Search ............... 137/183, 197, 171, 549; 138/41, 44

[56] References Cited

U.S. PATENT DOCUMENTS

| | | | |
|---|---|---|---|
| 1,237,252 | 8/1917 | Paul | 137/183 X |
| 2,020,563 | 11/1935 | Moore | 137/177 |
| 2,051,732 | 8/1936 | McKee | 137/183 X |
| 2,636,506 | 4/1953 | St. Clair | 137/177 |
| 3,261,140 | 7/1966 | Malec | 137/183 X |
| 3,715,870 | 2/1973 | Guzick | 55/466 |
| 3,776,254 | 12/1973 | Alesson | 137/183 |
| 3,877,895 | 4/1975 | Wonderland et al. | 55/97 |
| 3,893,473 | 7/1975 | Breece | 137/171 |

OTHER PUBLICATIONS

Flexitallic Gasket Co. Inc. Bulletin 776, "Flexitallic Drain Orifice".

Primary Examiner—Alan Cohan
Attorney, Agent, or Firm—Clifford N. Rosen

[57] ABSTRACT

A condensate removal device is disclosed which incorporates a strainer in unit with an orifice. The strainer is cylindrical with its longitudinal axis transverse to that of the vapor conduit in which it is mounted. The orifice is positioned inside the strainer proximate the end which is remoter from the vapor conduit.

3 Claims, 3 Drawing Figures

CONDENSATE REMOVAL DEVICE

The invention described herein was made in the course of a subcontract pursuant to a contract with the U.S. Atomic Energy Commission.

BACKGROUND OF THE INVENTION

1. Field of the Invention

Our invention is a device for removing condensate from the vapor lines of pressurized vapor systems. It incorporates an orifice and a strainer. References to such devices were found in the following places in the search files of the U.S. Patent and Trademark Office: Class 137, Fluid Handling; Subclass 171, Diverse Fluid Containing Pressure Systems, Fluid separating traps or vents; Subclass 177, Discriminating outlet for liquid. Class 55, Gas Separation; Subclass 466, With Separated Nongaseous Material Conducting or Treating Means; Digest 23, Steam Separators.

2. Description of the Prior Art

A "List of Prior Art Cited by Applicant," Form PTO-1449, is attached. This form lists the following references:

Ref. AA—U.S. Pat. No. 2,636,506,
AB—U.S. Pat. No. 2,020,563,
AC—U.S. Pat. No. 3,893,473,
AD—U.S. Pat. No. 3,715,870,
AE—U.S. Pat. No. 3,877,895,
AR—Flexitallic Gasket Co. Inc. Bulletin 776, "Flexitallic Drain Orifice."

Reference AA discloses a condesation drainer which incorporates an orifice. It is well known to use an orifice for draining condensate from steam lines; the orifice is sized to allow passage of the condensate approximately as fast as it is formed in the line in which it is installed, yet not so fast as to allow an excessive amount of steam to escape through the orifice.

Reference AA also shows a strainer incorporated in the device for removing "scale, rust or other sediment" to obviate "clogging or abrading of the orifice . . ."

The Reference AA device has drawbacks which our invention overcomes. Our invention has the orifice located within the envelope of the strainer, resulting in a much more compact device, lighter in weight and more sparing of materials; it is obviously a much simpler configuration. Our device is not attitude sensitive; it may be mounted in any position, while the Reference AA device appears to require mounting in the position shown in order to affect "a liquid seal for the orifice fitting 28." Our device has a single gasketed joint between atmosphere and system pressure (discounting the joints between line and device) whereas the Reference AA device has four tapered thread joints which are prone to leakage and seizing and which must be carefully resealed by a cumbersome process after being opened.

Reference AB also discloses a condensate removing device incorporating an orifice and a strainer. The orifice, however, is spaced from the strainer, resulting in a larger, heavier device. The device is also more complex, it is attitude sensitive and it has four sealed joints as opposed to just one.

Reference AC shows a condensate drainer with an integral strainer, but the device does not use an orifice in the strict sense of that term. As such it is only marginally relevant as prior art. In any case, it contains a moving part in contradistinction to our invention, and has three sealed joints rather than just one.

References AD and AE both show condensate removal devices incorporating an orifice and an integral strainer. As Reference AR discloses, however, it is necessary when using Reference AE devices with orifices smaller than 0.125 in. (3.175 mm) to install a strainer upstream of the device, the screen in the Reference AE device serving admittedly as only secondary protection.

The reason the Reference AE/AR device requires an upstream strainer is that, by itself, the area of the screen is too small; it quickly becomes clogged and needs cleaning. This can be a serious deficiency in certain critical applications, for example in the line providing steam to a ship's propulsion turbine or to a turbine generating electrical power. If the strainer becomes clogged, condensate will not be removed at the proper rate and may enter the turbine where its effects can be catastrophic.

Our invention overcomes this deficiency by providing a combination strainer/orifice which has a much larger area of strainer than the Reference AE/AR device by itself, yet which has approximately the same space envelope. Thus, it is possible with our invention to use a strainer fine enough to accommodate a larger range of orifice sizes, including those much smaller than 3.175 mm. Our invention therefore substitutes one component for two—the Reference AE/AR device and an upstream strainer—and is consequently cheaper, easier to install and maintain, lighter and takes less space.

In applications where the orifice size is 3.175 mm or larger and it is not necessary to use an upstream strainer with the Reference AE/AR device, our invention still has important advantages: with the larger surface area of strainer, our device will not lose effectiveness as fact as the Reference AE/AR device and will thus be more reliable and need less frequent maintenance. Furthermore, whereas the Reference AE/AR device is attitude sensitive—if it is installed in a vertical line, for instance, particles passing through the screen tend to fall on the orifice–our invention is not. Regardless of the orientation, any particles which may by chance pass through the strainer of our device tend to collect at places other than on the orifice.

Our invention is also easier to maintain and inspect than the Reference AE/AR device. This is particularly so in those applications where the Reference AE/AR device requires an upstream strainer as then it is necessary to deal with two components rather than one. But just comparing one for one, our device is more advantageous. It requires the removal of only four nuts to expose both the orifice and strainer for inspection, cleaning or replacement. The orifice need not be removed for inspection. In reassembling, only one gasket is involved and the operation is very simple. The Reference AE/AR device requires first the removal of a number (larger than four, depending on rated size) of flange bolts. Then the flanges must be sprung or jacked apart before the screen and orifice plate can be exposed. Two gaskets are required for the device rather than just one, and the reassembly procedure requires more care in positioning of parts. In a direct comparison with Reference AE/AR devices with upstream strainers our invention required much less than half the time to disassemble, inspect, clean and reassemble.

A further advantage of our invention inheres in the single sealed joint: in general, the more joints the more prone to leakage. The Reference AE/AR device, as noted, has two sealed joints between system pressure and atmosphere; the provision of an upstream strainer adds at least one more joint.

BRIEF SUMMARY OF INVENTION

Our invention is a condensate removal device incorporating an orifice and an integral strainer in a single compact fitting. The strainer is cylindrical and the orifice is located within the envelope of the strainer at the end remote from the steam outlet with the axis of the orifice parallel to the longitudinal axis of the strainer. The orifice is mounted on the end of a tubulate orifice place support concentric with the strainer; the annular space thus formed between the support and the strainer serves to hold particles which may occassionally pass the strainer. By mounting the orifice on the end of the tubulate support remote from the steam outlet, erosion of the outlet passage is avoided.

The device is very simple, consisting of only two main assemblies, the body and the cap. The orifice is mounted in the body as previously described. The cap is attached to the body by means of four stud bolts and nuts with one gasketed joint. The strainer is rigidly attached to the cap.

The device may be fixed in the vapor line in any way known in the art, for example by welding or by means of threaded fittings.

The object of the invention is to provide a condensate removal device of the orifice type which incorporates a strainer for obviating clogging of the orifice and which is simpler, easier to install, more compact, lighter and cheaper to make than existing orifice type condensate removal devices, which has fewer sealed joints and which is easier to inspect and maintain.

DETAILED DESCRIPTION OF INVENTION

It is often necessary in the operation of pressurized vapor systems to remove condensate from vapor conduits. In a steam system, for example, where the working fluid is water, the presence of condensate (water) in vapor (steam) conduits can have deleterious effects. Many types of devices have been proposed and used for removing this condensate.

Our invention has been made for use in steam systems and it will be described as such in the following specification. It may, however, be used in other types of pressurized vapor systems where the working fluid is other than water.

For the purpose of removing condensate, our device may be placed in a line (branch line) which branches off from another line (supply line) which is supplying steam to a using device. The branch line is ordinarily positioned at a point at which condensate is expected to collect. For example, it may branch from a drip leg just before a using device to prevent condensate from entering, or from the supply line just after the using device to remove condensate formed there. Examples of placement of a condensate removal device are shown in Reference AR.

In most applications of condensate removal devices the fluid in the branch line will be mostly condensate; occasionally steam will pass. However, since the branch line is from a steam line, in what follows the line in which our device is placed will be referred to as a steam line.

Figure 1:
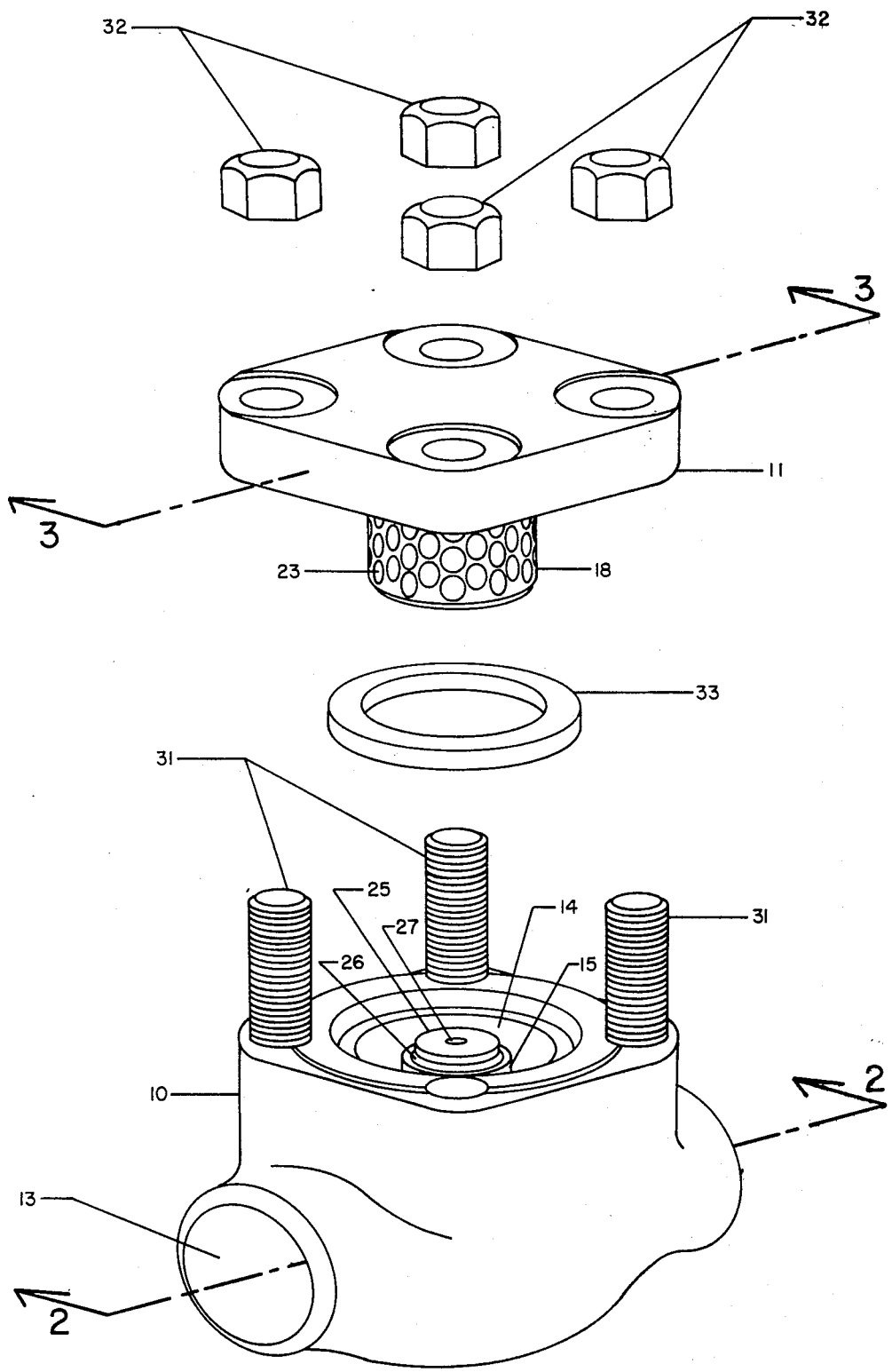
FIG. 1 is an exploded view of a condensate removal device constructed according to our invention.
Figure 2:
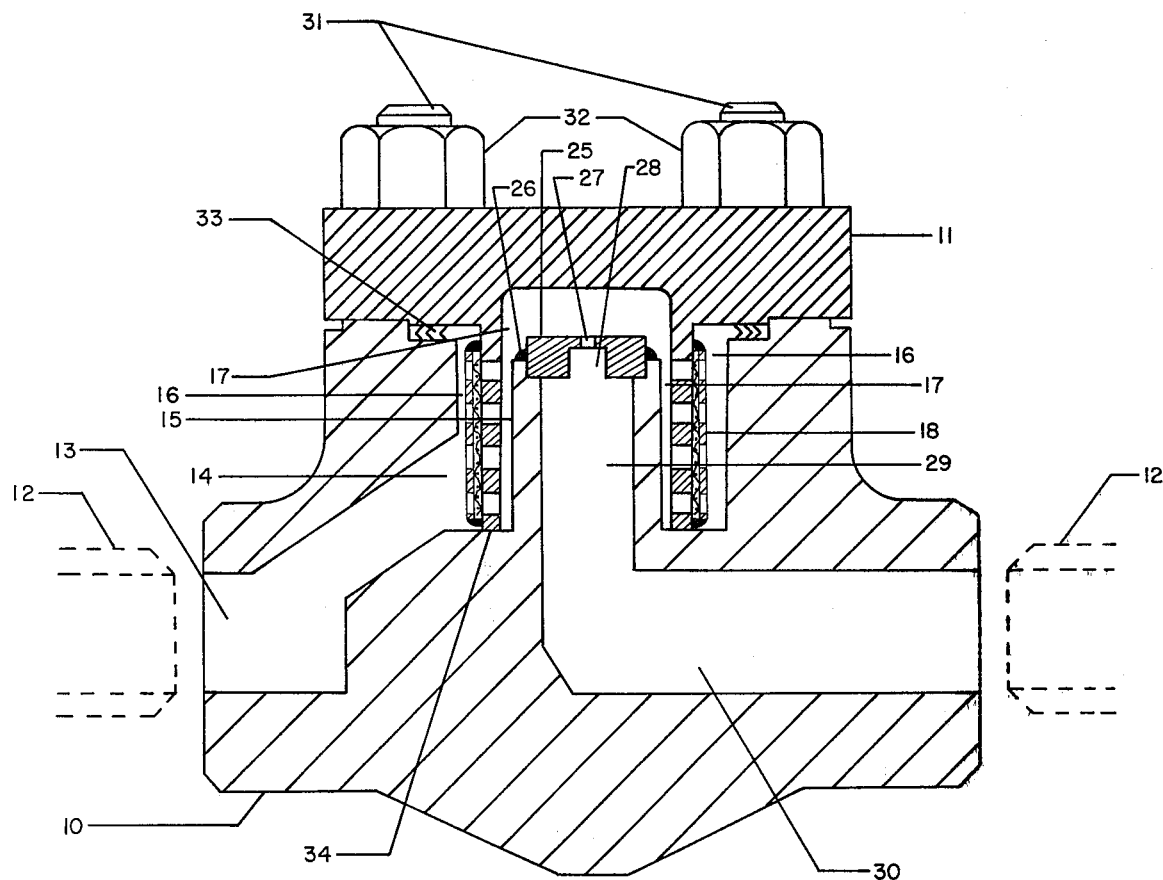
FIG. 2 is an enlarged section taken on line 2—2 of FIG. 1 with the device assembled.

As shown in FIG. 1 our invention is comprised of two main parts, the body 10 and the cap 11. The device may be mounted in a steam line by any method known in the art. In FIG. 2, for example, the device is shown prior to being welded into a steam line 12 shown in phantom.

Referring to FIG. 2, in the body 10 is formed an inlet passage 13 which connects with a cylindrical annular chamber 14. The disposition of this chamber 14 may perhaps be discerned more clearly in FIG. 1 where it may be seen to surround a tubulate orifice plate support 15 which projects from one end of the chamber 14.

Figure 3:
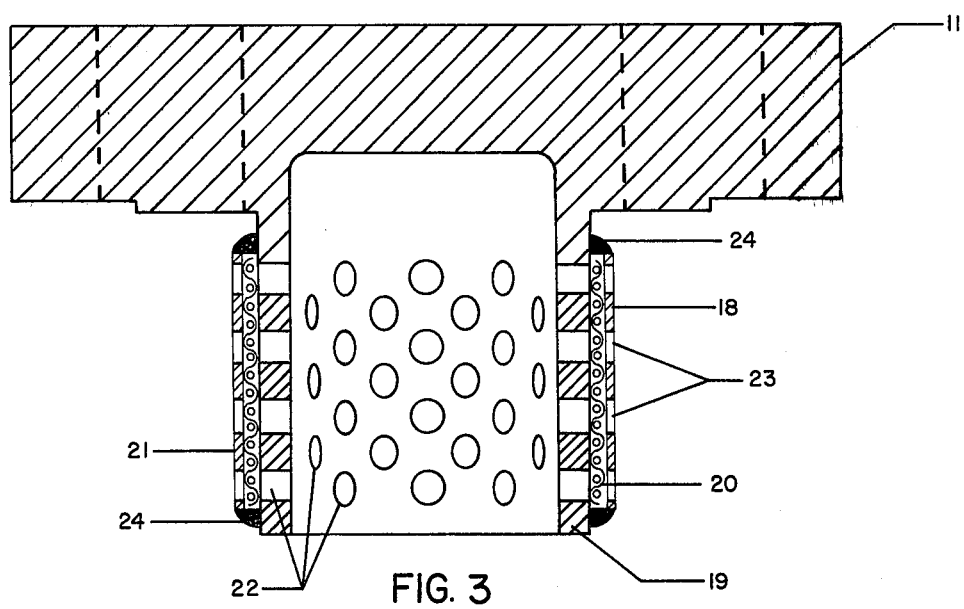
FIG. 3 is an enlarged section taken on line 3—3 of FIG. 1.

Referring again to FIG. 2, when the cap 11 is assembled to the body 10 annular chamber 14 is divided into an outer annular chamber 16 and an inner chamber 17 by the cylindrical strainer 18. Strainer 18 is rigidly attached to the cap 11 and may be formed in any manner. As shown in FIG. 3, for example, it may comprise a cylindrical inner support 19 attached to the cap 11, a cylindrical woven screen 20 and a cylindrical outer support 21. In the inner support 19 are formed passages—three of which are indicated at 22—which are aligned with similar passages—two of which are indicated at 23-in the outer support 21. The outer support 21 may be attached to the inner support 19 by the welds 24.

At the distal end of orifice plate support 15 is mounted an orifice plate 25 by any means known in the art, for example by the weld 26. The length of the tubulate orifice plate support 15 is such that the orifice plate 25 is positioned within the envelope of the cylindrical strainer 18 proximate the end of the strainer 18 which is remoter from the steam line 12.

In the center of the orifice plate 25 is an orifice 27. Part of the orifice plate 25 is cut away at 28 under the orifice 27, the purpose of which will be discussed below.

The bore of the orifice plate support 15 functions as an outlet passage 29 for the working fluid; it communicates with a longitudinal outlet passage 30 which in turn is in direct flow communication with the steam line 12.

The outer chamber 16, the strainer 18, the inner chamber 17, the orifice plate support 15, the orifice 27 and the outlet passage 29 are each generally cylindrical in form and concentric with one another. These components are located generally off the axis of the steam line with their longitudinal axes generally transverse to the axis of the steam line in which the device is mounted, although other configurations are possible.

The cap 11 to which the strainer 18 is attached is fastened of the body 10 by any means known in the art such as stud bolts 31 and nuts 32. (In FIG. 1, one stud 29 has been removed for clarity.) A gasket 33 seals the joint between the cap 11 and the body 10, the only joint between vapor pressure and atmosphere on our device. The gasket 33 may be of the type known in the art as an Inconel spiral wound gasket.

We provide for a controlled clearance seal at the interface 34 between the strainer 18 and the body 10 as shown in FIG. 2. The purpose of this seal is to ensure that fluid flow is entirely through the strainer 18 so that no particles bypass the strainer and clog the orifice 27.

In the embodiment noted below, the clearance at interface 34 was controlled in the range 0.00 to 0.25 mm; this may be achieved by specifying corresponding tolerances on the appropriate dimensions of the cap and body. Provision of this controlled clearance seal contributes to the simplicity of our invention; commonly in the prior art a gasketed joint has been specified in such applications bringing extra expense and complication of both installation and maintenance.

The particular embodiment of our condensate removal device just described has been used in the propulsion system of a nuclear powered aircraft carrier where steam conditions may be 3500–10000 kPa pressure and up to 415° C. temperature. The material of which the device is made in this embodiment is stainless steel except for the stud bolts 31, nuts 32 and gasket 33. The stud bolts 31 may be of chrome-moly steel and the nuts 32 medium carbon steel. The material of the gasket 33 has already been noted. The materials and configuration of the device may, of course, be modified to suit other applications.

In the operation of our condensate removal device, it may be installed, for example, in a branch from the line supplying steam to a prime mover steam turbine. Its purpose is to remove condensate from the line to prevent the liquid from reaching the turbine. Liquid entering a turbine can cause, at the least, premature erosion of the turbine blades. At the worst, slugs of condensate entering the turbine can cause catastrophic destruction of the turbine wheels.

Referring to FIG. 2, condensate enters the device through the inlet passage 13, then flows to the annular chamber 16 which surrounds the cylindrical strainer 18. The entire area of the sides of the strainer 18 is thus utilized to strain from the working fluid any particles larger than the orifice 27 which may be entrained in it.

In the embodiment just noted, the screen 20 was a 60×60 mesh woven screen of 0.19 mm wire diameter with openings of about 0.25 mm. In practice any suitable medium could be used to filter the flow and the size of the openings could be varied to suit the application.

Should any particles manage by chance to enter the inner chamber 17, the configuration of our device is such that the chance of their clogging the orifice 27 is minimized, no matter the orientation in which the device is mounted. Whether mounted "upright" as in FIG. 2, "upside down," or "sideways," as in a vertical steam line, gravity would tend to collect particles in the inner chamber 17. This is by virtue of the orifice 27 being positioned by means of the orifice plate support 15 just at the end of the cylindrical strainer 18. Were the orifice 27 located below the end of the strainer 18, particles entering at the end of the strainer above the orifice 17 might tend to fall on the orifice. In the closest prior art device, as already noted (Reference AE/AR), particles have a tendency to fall directly on the orifice when the device is mounted vertically. Other prior art devices are attitude sensitive for other reasons already discussed.

Positioning the orifice within the envelope of the strainer overcomes another problem with some prior art devices: sheer size. If the orifice were located outside the envelope of the strainer, for example as it is in References AA and AB, the device of necessity would have to be larger. Our device is thus smaller, more compact, lighter and more sparing of material. Our device is not significantly smaller than a Reference AE/AR device by itself but in applications where the orifice diameter may be 3.175 mm or less, as noted above, the Reference AE/AR device requires an upstream strainer; for this case, a direct comparison shows our device to have a unit cost about ⅔ that of the Reference AE/AR devices and an installation cost half as great.

Condensate entering the inner chamber 17 is then forced by line pressure through the orifice 27. As already noted, this orifice is sized according to the amount of condensate it must pass. In a typical application, under the steam conditions noted above and with the device mounted in a ½" (nominal) steam line, the orifice size might be 0.8 mm. As noted above, the orifice would be sized so that it passes condensate nearly constantly and rarely passes steam, a practice and condition well known in the art.

Upon passing through the orifice 27, the condensate, depending on its temperature, may flash to steam because of the reduced pressure in the outlet passage 29. If the orifice were of sufficient length, this flashing would occur in the orifice, thus choking the flow of condensate. Cutting away the orifice plate 25 at 28 shortens the orifice, however, so that the flashing occurs in the space 28 and does not restrict the flow of condensate as much. This practice, though known in the art, is not followed in any of the references.

Past the orifice 27, the flow—now mixed steam and condensate—passes through the outlet passage 29 and the longitudinal outlet passage 30 to the steam line 12. In this process, the length of the orifice plate support 15 serves a further function: it increases the length of the free discharge path behind the orifice 27, thus avoiding erosion of the longitudinal outlet passage 30 under the orifice caused by impingement of the high velocity flow of steam and condensate.

We claim:

1. In a device for removing condensate from a vapor conduit in a pressurized vapor system containing a working fluid, which device comprises a rigid, stationary orifice in unit with a cylindrical strainer, said cylindrical strainer being positioned:
    a. upstream of said orifice for preventing passage of particles larger than said orifice,
    b. generally off the axis of said vapor conduit,
    c. with its longitudinal axis generally transverse to that of said vapor conduit and arranged such that said fluid enters the sides of said cylindrical strainer and exits the end,
the improvement wherein:
    said unit comprises a body and a separable cap, said cylindrical strainer being rigidly attached at one end to said cap;
    said body contains a working fluid inlet passage, a tubulate orifice plate support attached at one end to said body, an annular chamber surrounding and concentric with said tubulate orifice plate support, and a working fluid outlet passage;
    the distal end of said strainer is seated in fluid sealing relationship with said body proximate the base of said tubulate orifice plate support when said cap is attached in fluid sealing relationship to said body, said cap and cylindrical strainer thereby dividing said annular chamber into an outer chamber bounded by said body, said strainer and said cap and an inner chamber bounded by said strainer, said tubulate orifice plate support, said orifice plate and said cap;

said orifice plate is rigidly attached to the distal end of said tubulate orifice plate support and concentric therewith;

said orifice plate contains an orifice concentric therewith;

said tubulate orifice plate support is of such length that said orifice is positioned proximate the end of said cylindrical strainer which is remoter from said vapor conduit such that erosion of said body under said orifice by fluid flowing through the orifice is minimized, and such that said orifice is positioned out of a direct line from any of the openings in said strainer;

and said outer chamber is in direct flow communication with said inlet passage and said inner chamber is in flow communication through said orifice with said outlet passage.

2. The device of claim 1 wherein said fluid sealing relationship between the distal end of said cylindrical strainer and said body comprises a controlled clearance seal which is the only joint between the working fluid pressure in said inlet passage and the pressure in said outlet passage.

3. The device of claim 2 wherein said orifice plate is cut away behind said orifice so as to minimize the length of said orifice.

* * * * *